Sept. 18, 1962  W. J. TROYER  3,054,305
ELLIPTICAL VIBRATION DAMPER
Original Filed June 23, 1958
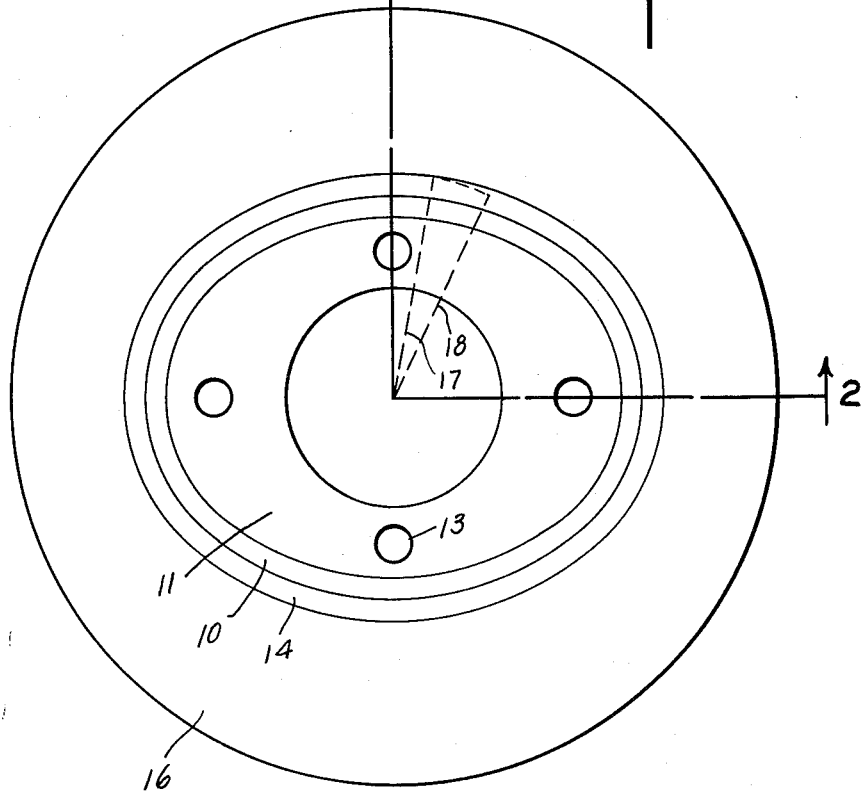
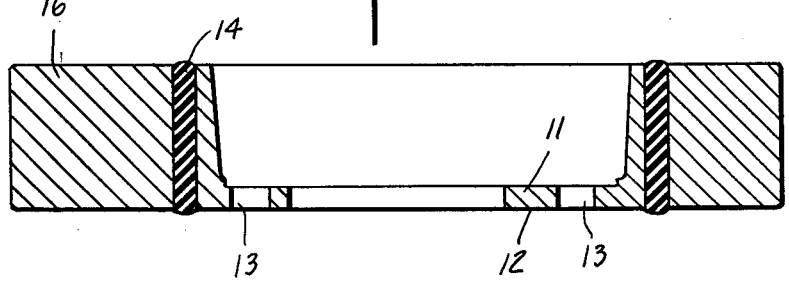
INVENTOR.
WILLIAM J. TROYER.
BY
Lockwood, Woodard, Smith & Weikart
ATTORNEYS.

United States Patent Office 3,054,305
Patented Sept. 18, 1962

3,054,305
ELLIPTICAL VIBRATION DAMPER
William J. Troyer, Columbus, Ind., assignor to Schwitzer Corporation, Indianapolis, Ind., a corporation
Original application June 23, 1958, Ser. No. 743,893, now Patent No. 2,948,129, dated Aug. 9, 1960. Divided and this application June 20, 1960, Ser. No. 37,826
2 Claims. (Cl. 74—574)

This invention relates generally to vibration dampers and in particular to a construction which can be utilized for reducing the torsional vibration of the crankshaft of a reciprocating engine or the like. This is a division of my copending application, Serial No. 743,893, filed June 23, 1958, now Patent No. 2,948,129, for Elliptical Vibration Damper.

In tuned dampers of the type conventionally used to reduce torsional vibrations in shafts such as reciprocating engine crankshafts, a straight cylindrical or annular elastic element is interposed between a driven inertia member and a driving center member which is mounted for rotation on the shaft. In applying these conventional dampers difficulty has been encountered as a result of permanent relative angular displacement between the driving and driven members. In damper assemblies wherein these elements are held by precompression of the elastic element, this permanent set or displacement has a deleterious effect on the elastic element and renders the damper useless as a means for timing the engine with which it is associated. This shift of the elastic element may also cause unbalance in the assembly. In damper assemblies wherein a bonding agent is used to retain the driving and driven elements in their respective positions, the bond may be broken by large relative angular movement between the driving and driven members and the damper thereby destroyed. Further, because of the stress-strain relationship characteristic of the elastic materials conventionally used, an increase in amplitude of vibration causes a reduction in the force-deflection ratio, or spring rate, of the assembly and complicates the task of obtaining optimum tuning, that is, the optimum ratio of damper frequency to the mass elastic system frequency.

It is an object of the present invention to provide a torsional vibration damper assembly which prevents permanent relative angular displacement between the driving and driven members, thereby eliminating certain of the shortcomings of conventional damper structures and making possible improved damper performance.

A further object of the present invention is to provide a torsional vibration damper assembly utilizing an elastic element and formed so as to place the element in shear when subjected to small amplitude torsional vibrations and in compression when subject to high amplitude torsional vibrations.

A further object of the present invention is to provide a torsional vibration damper assembly characterized by an elliptical configuration of the surfaces confining the elastic element, whereby the spring rate of the assembly increases with the magnitude of the torsional vibrations imposed thereon.

A further object of the present invention is to provide a vibration damper assembly which is effective to limit both first mode vibrational amplitudes and second mode vibrational amplitudes.

The full nature of the invention will be understood from the accompanying drawings and the following description and claims:

FIG. 1 is an end view of a damper assembly embodying the present invention.

FIG. 2 is a side sectional view of the damper assembly taken generally along the lines 2—2 of FIG. 1.

Referring to the drawings, the assembly embodying the present invention comprises a driving member 10 having a generally elliptical cylinder configuration. The driving member is provided with an inwardly-extending mounting flange 11 providing a radial surface 12 which is adapted to be mounted in contiguous relation with a hub, accessory drive pulley, or similar means conventionally operatively associated with the crankshaft of a reciprocating engine. The flange 11 may include a plurality of apertures 13 for receiving bolts for attaching the driving member to the shaft.

An elastic member 14 embraces the outer surface of the driving member and, in turn, supports an outer, driven inertia member 16. The elastic member confined between the driving and driven members may be formed of rubber or a similar elastic composition and may be injected into the space between the driving and driven members either prior to or after curing. The elastic member may be in a state of radial compression in the assembly, and a suitable bonding agent may be applied between the elastic element and the driving and driven members depending upon the mode of manufacture used and the practical operational conditions.

It will be noted that the central aperture in the driven member 16, which accommodates the driving member and the elastic element, has an elliptical configuration which corresponds to the elliptical configuration of the driving member. It should further be noted that the driving and driven members are assembled so that the corresponding major and minor axes of the elliptical aperture and of the driving member lie substantially in the same plane.

In operation with the driving member rotating with a shaft subject to torsional vibration, the driven inertia member will subject the elastic element to both shear stress and compressive stress. For small relative angular deflections of the driven and driving members the elastic element is subjected primarily to shearing stress. For large relative angular deflections the elastic element is placed under compressive stress. This action may be made clear by reference to broken lines 17 and 18 in FIG. 1, it being understood that the magnitude of the distances illustrated is exaggerated for the sake of clarity. Should a reference point on the margin of the elliptical aperture formed in the driven member 16 be displaced from a position vertically above the aperture center to a position defined by the line 17, the elastic element, during this movement, is stressed primarily in shear. Upon the occurrence of higher amplitude vibrations, displacing the reference point to a position defined by the line 18, it will be evident that the elastic element is placed primarily under compressive stress in the upper right-hand quadrant and in the diametrically opposite quadrant. In the adjacent quadrants the elastic element will be placed under tensile stress, assuming the element is bonded to rather than precompressed between the driving and driven members. The actual magnitude of the normal deflections between the driving and driven members, however, are so small that the tensile stress thereby placed on the elastic element remains well within its ultimate strength.

It is a characteristic of a restrained elastic element of the type herein referred to that it is flexible or soft when subjected to shearing stress, but is relatively inflexible or stiff when placed under compressive stress. The shift in the type of stress imposed upon the elastic element, as described above, results in an automatic increase in the spring rate of the damper assembly as the amplitude of the torsional vibrations to which it is subjected increases. Thus, by the proper selection of the amount of eccentricity of the elliptical surfaces on the driving and driven members for a given installation, a desirable shift in spring rate of the assembly can be obtained.

In the application of a vibration damper of the type conventionally used to a typical mass elastic system, such as an automotive engine, two modes of vibration of the critical orders are normally encountered. Damper assemblies having frequencies below the optimum are effective in damping first mode amplitudes, but allow second mode amplitudes to become excessive. Damper assemblies having natural frequencies above the optimum are effective in damping second mode amplitudes but allow excessive first mode vibrations. In conventional design of tuned vibration dampers, the natural frequency is selected in such a manner that it limits the amplitudes of each of these modes to approximately equal values.

Utilizing the damper structure of the present invention, the damper may be designed with a lower natural frequency than would be used with its conventional counterpart having a circular configuration. Thus, for small relative angular displacement between the driving and driven members, the low natural frequency drastically reduces the first mode vibration amplitudes. The second mode vibration amplitudes, which occur at higher speed are prevented from becoming excessive by the change in spring rate, or stiffening of the assembly caused by the elliptical design. Since the higher spring rates are more effective in damping second mode vibrations, the amplitudes of the second mode vibrations are thus controlled without corresponding loss of the control of the first mode vibration amplitudes. The speed at which the second mode vibrational amplitudes occurs is also desirably increased due to the effect of this higher damper frequency on the tuning of the mass elastic system.

While the invention has been disclosed and described in some detail in the drawings and foregoing description, they are to be considered as illustrative and not restrictive in character, as other modifications may readily suggest themselves to persons skilled in this art and within the broad scope of the invention, reference being had to the appended claims.

The invention claimed is:

1. A damper assembly for reducing torsional vibration of a shaft having at least two modes of vibration, said assembly comprising a driving member having an outer surface generally in the form of an elliptical cylinder and attachable in concentric relation to the shaft for rotation therewith, a driven inertia member mounted concentrically of said driving member and having an elliptical aperture therein accommodating said driving member, said outer surface and said elliptical aperture having a common center of generation, an elastic element interposed between said driving member and said driven member and having the form of an elliptical cylinder, the corresponding major and minor axes of said elliptical aperture and of said driving member lying in the same plane, said assembly being tuned to have a relatively low natural frequency whereby upon small angular displacement of said driving and driven members relative to each other said elastic element is subjected primarily to shear stress to provide a given spring rate for reducing first mode vibration amplitudes and upon large angular displacement of said members said elastic element is subjected primarily to compressive stress to provide an increased spring rate for reducing second mode vibration amplitudes.

2. A damper assembly for reducing torsional vibration of a shaft having at least two modes of vibration, said assembly comprising driving and driven members, one of said members having an outer surface generally in the form of an elliptical cylinder and attachable in concentric relation to the shaft for rotation therewith, the other of said members being mounted concentrically of said one member and having an elliptical aperture therein accommodating said one member, said outer surface and said elliptical aperture having a common center of generation, an elastic element interposed between said members, the corresponding major and minor axes of said elliptical aperture and of said one member lying in the same plane, said assembly being tuned to have a relatively low natural frequency whereby upon small angular displacement of said members relative to each other said elastic element is subjected primarily to shear stress to provide a given spring rate for reducing first mode vibration amplitudes and upon large angular displacement of said members said elastic element is subjected primarily to compressive stress to provide an increased spring rate for reducing second mode vibration amplitudes.

References Cited in the file of this patent

UNITED STATES PATENTS

| | | |
|---|---|---|
| 1,976,789 | Lee | Oct. 16, 1934 |
| 2,039,378 | Anderson | May 5, 1936 |
| 2,363,469 | Goldschmidt | Nov. 21, 1944 |
| 2,597,747 | Peirce | May 20, 1952 |